US005129116A

United States Patent [19]

Borders et al.

[11] Patent Number: 5,129,116

[45] Date of Patent: Jul. 14, 1992

[54] OPERATING MECHANISM FOR A HOSPITAL BED HEAD PANEL

[75] Inventors: Richard L. Borders, Cincinnati; David C. Newkirk, Fairfield, both of Ohio; Sandy M. Richards, Centerville; Daniel G. Stafford, Batesville, both of Ind.

[73] Assignee: Hill-Rom Company, Inc., Batesville, Ind.

[21] Appl. No.: 728,746

[22] Filed: Jul. 12, 1991

[51] Int. Cl.[5] .......................... A47B 7/02; F16H 27/02

[52] U.S. Cl. .......................... 5/617; 5/600; 5/424; 5/89.15; 5/459

[58] Field of Search .......................... 5/60, 66, 424; 75/89.15, 459

[56] References Cited

U.S. PATENT DOCUMENTS

| | | | |
|---|---|---|---|
| 2,809,688 | 10/1957 | Brundage | 74/459 X |
| 2,844,969 | 7/1958 | Lohr | 74/459 X |
| 2,924,265 | 2/1900 | Himka | 74/459 X |
| 3,220,718 | 11/1965 | Wikkerink | 74/89.15 |
| 3,858,452 | 1/1975 | Gatland et al. | 74/89.15 |
| 3,877,088 | 4/1975 | Bouman | 5/66 |
| 4,038,709 | 8/1977 | Kerwit | 5/66 X |
| 4,407,030 | 10/1983 | Elliott | 5/424 X |
| 4,559,655 | 12/1985 | Peck . | |
| 4,799,734 | 1/1989 | Peria | 74/89.15 X |

FOREIGN PATENT DOCUMENTS

| | | | |
|---|---|---|---|
| 2205232 | 12/1988 | United Kingdom | 5/424 |

*Primary Examiner*—Michael F. Trettel
*Attorney, Agent, or Firm*—Wood, Herron & Evans

[57] ABSTRACT

A hospital bed has a base and a patient support mounted on the base, the patient support including a head panel that pivots between a horizontal position and an upwardly-inclined position to raise the patient to a sitting attitude. The head panel is connected to a ball nut mounted on a screw driven by a motor to raise and lower the head panel. The ball nut has a ratcheting latch that enables the head panel to be lifted manually and prevents the head panel from being driven positively downwardly in such a way as to injure some thing or person in its path.

4 Claims, 3 Drawing Sheets

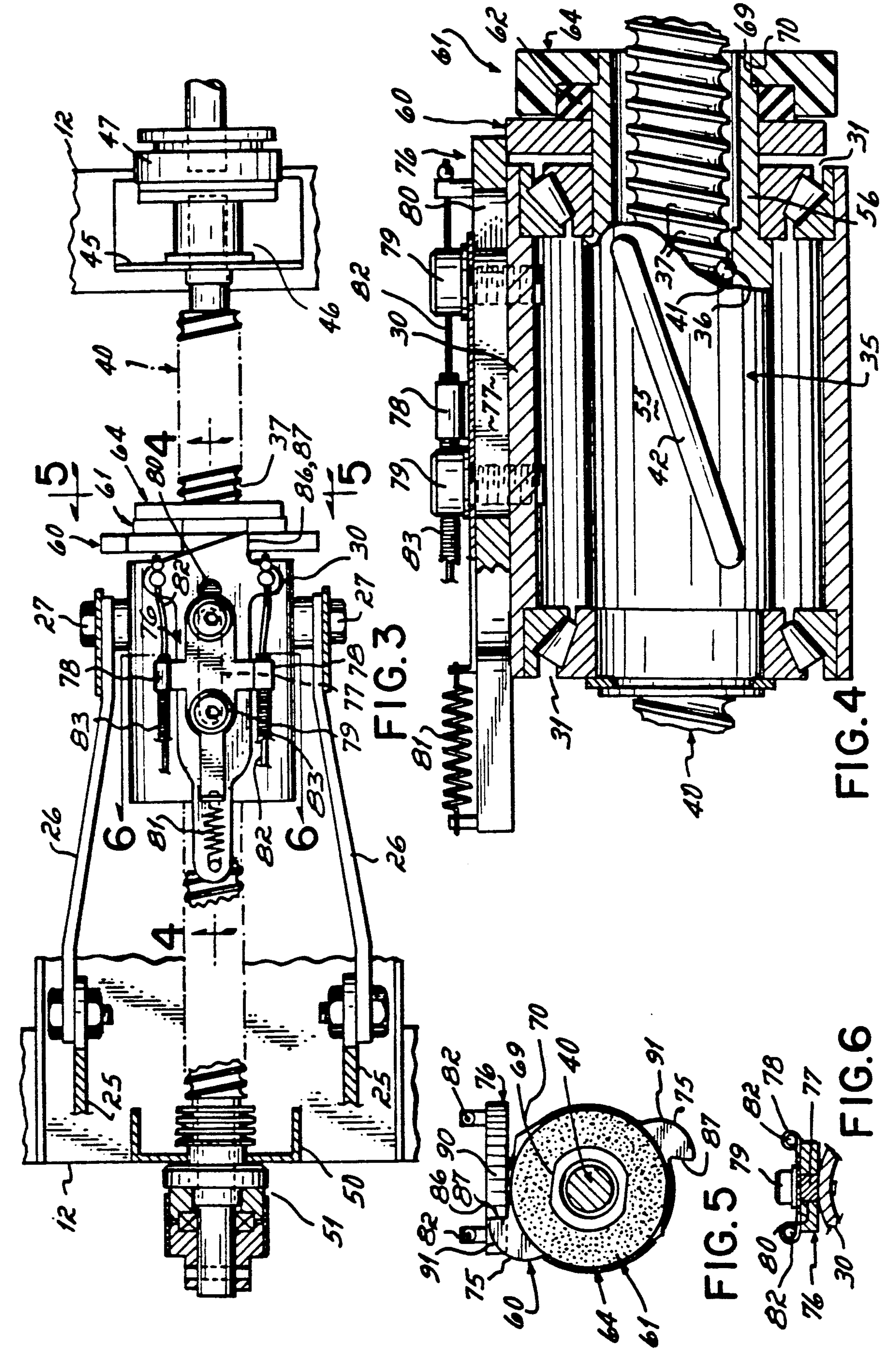

OPERATING MECHANISM FOR A HOSPITAL BED HEAD PANEL

This invention relates to a hospital bed having a head panel that is pivotable so that it can be raised and lowered.

The raising and lowering mechanism to which the invention is directed is depicted in U.S. Pat. No. 4,559,655. That patent discloses a hospital bed having a base and an articulated frame including a head panel that is pivoted with respect to a seat panel. A longitudinally-extending screw is directly connected to a motor. A ball nut is mounted on the screw and has a sleeve connected to a lever which is in turn connected to the head panel. Rotation of the screw, as driven by the motor, causes the ball nut to move linearly with respect to the screw and that in turn raises and lowers the head panel. The ball nut carries a latching collar and the sleeve has a slidably-mounted bolt that is engageable with the latching collar. When the bolt is engaged with the collar, the ball nut is prevented from rotating when driven by the screw and thus moves linearly. When the bolt is withdrawn from the latching collar, the nut is free to rotate with respect to the sleeve and therefore can move freely with respect to the screw, permitting the head panel to be manually raised and lowered.

SUMMARY OF THE INVENTION

The objective of the present invention has been to improve upon the operation of the head panel to permit the head panel to be raised without manually releasing a bolt from a latching collar.

A further objective has been to prevent the motor from positively driving the head panel downwardly.

The first feature of the objective simplifies the work of the attending nurse in rapidly raising the back panel for the patient. The second feature, that is, disconnecting the positive downwardly drive, minimizes the possibility of injury to some thing or person in the path of the head panel as it is being lowered through the operation of the motor.

These objectives of the invention and the improved features are attained using the general organization disclosed in U.S. Pat. No. 4,559,655 while modifying the latching collar and bolt. In accordance with the present invention, the latching collar is formed partly as a cam, and the bolt is provided with a cooperating cam surface so that when a force is applied to raise the head panel manually, the cam collar will spin, or ratchet, with respect to the bolt on the sleeve surrounding the ball nut, thus effectively disengaging the driving relationship of the ball nut with respect to the screw. The same action is obtained when the screw is rotated in a direction to lower the head panel. In the event that the head panel engages an obstruction in its motor and screw driven descent, the cam collar, instead of driving the head panel down, will ratchet freely with respect to the cam surface of the latch on the sleeve. The screw will therefore rotate the ball nut harmlessly and no linear movement of the ball nut (thus no linear movement of the head panel) will take place as long as there is an obstruction blocking the descent of the head panel.

BRIEF DESCRIPTION OF THE DRAWINGS

The several features and objectives of the present invention will become more readily apparent from the following detailed description taken in conjunction with the accompanying drawings in which:

FIG. 3 is a cross-sectional view taken along lines 3—3 of FIG. 2;

FIG. 4 is a cross-sectional view taken along lines 4—4 of FIG. 3;

FIG. 5 is a cross-sectional view taken along lines 5—5 of FIG. 3;

FIG. 6 is a cross-sectional view taken along lines 6—6 of FIG. 3; and

DETAILED DESCRIPTION OF THE INVENTION

Figure 1:
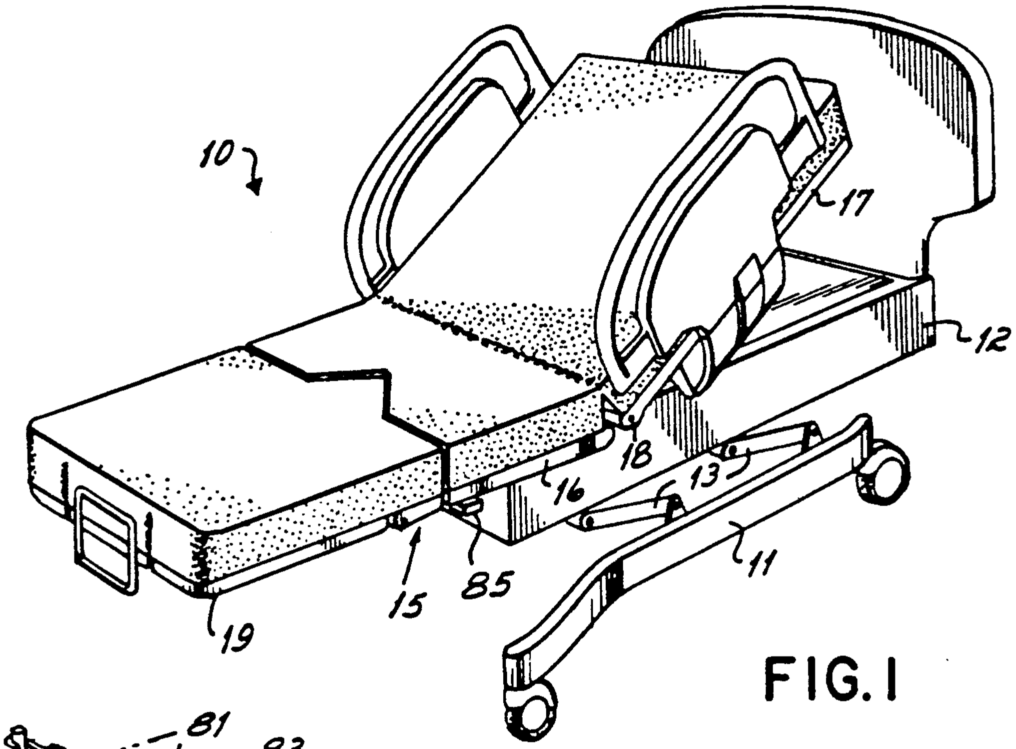
FIG. 1 is a perspective view of a hospital bed employing the present invention.
Figure 2:
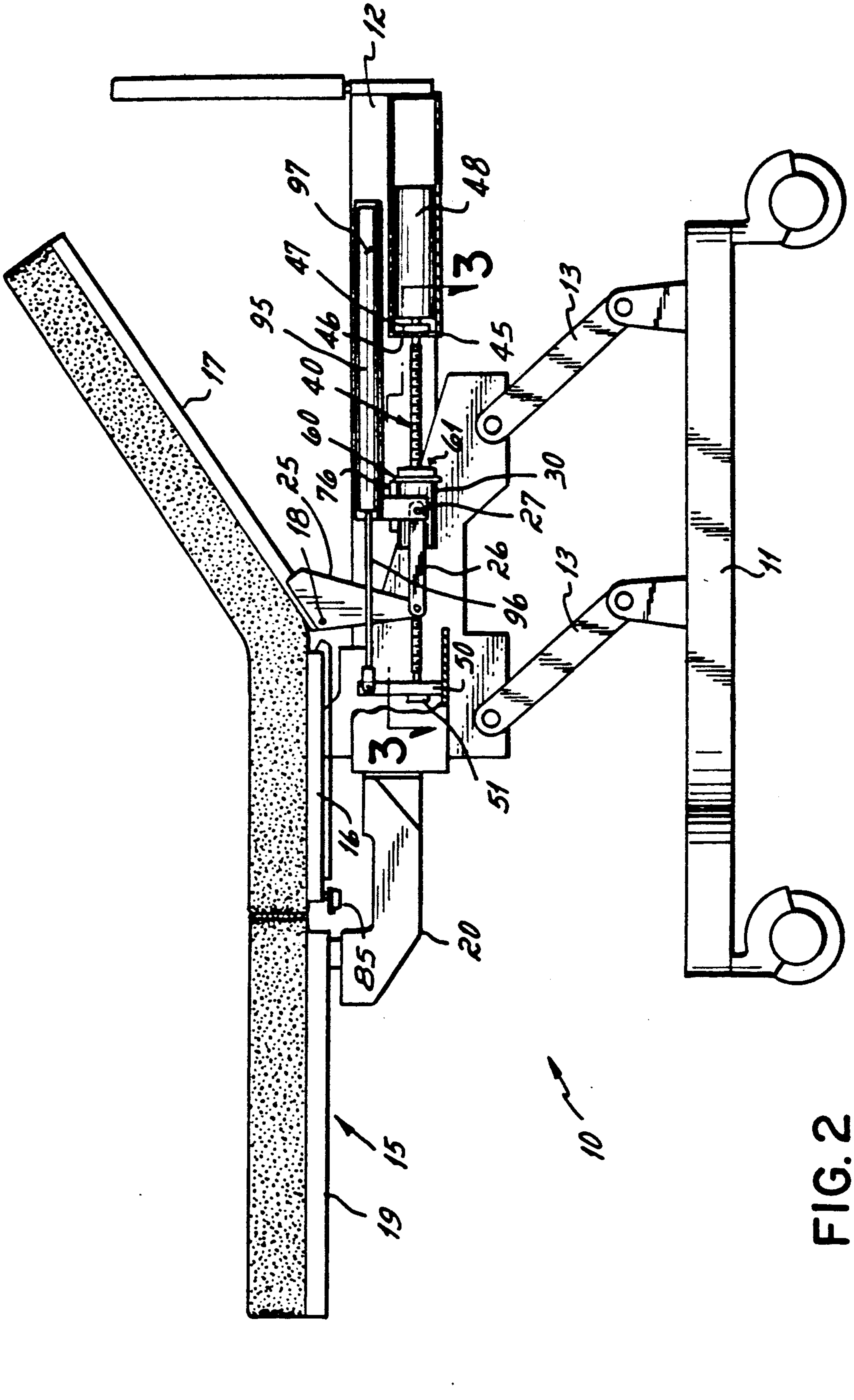
FIG. 2 is a side elevational view partly in section of the hospital bed illustrating the mechanism for raising and lowering the head panel.

As shown in FIGS. 1 and 2, a hospital bed 10 has a base 11 and a frame 12 mounted on the base by parallel links 13 so that it can be raised and lowered. In the illustrated embodiment, the bed is a birthing bed, but the invention is equally applicable to other types of hospital beds. The bed has a patient support 15 which includes a seat panel 16 and a head panel 17 pivoted at 18 to the seat panel 16 or frame 12. A leg rest 19 is mounted on the frame with a mechanism partly shown at 20 in FIG. 2 for raising and lowering it.

As shown in FIG. 2, the head panel 17 has a pair of depending lever arms 25 fixed to it. The lower ends of the lever arms are connected to a yoke 26 which is pivotally connected to studs 27, the studs being mounted on a sleeve 30. The sleeve 30 is mounted by bearings 31 at each end to a ball nut 35 (FIG. 4). The ball nut and sleeve mechanism is substantially identical to that described in U.S. Pat. No. 4,559,655 which is fully incorporated herein by reference. The ball nut 35 is in the form of a conventional ball bearing screw/nut assembly available, for example, from Rockford Ball Screw Co., Rockford, Ill., and thus need not be described in detail. The nut has an internal helical race 36 which corresponds to an external helical groove 37 on a screw 40. Ball bearings 41 are mounted within the helical groove and race and are adapted to circulate from one end of the nut race to the other by means of an external return tube 42. There occurs no physical contact between the screw 40 and the nut 35. As the screw 40 rotates, and the rolling balls 41 reach an end of the nut 35, the balls are conducted to the other end of the race by means of a return tube 42. In this fashion, the balls are able to recirculate endlessly.

As long as the nut is prevented from rotation, the rotation of the screw 40 will drive the nut linearly and positively. But if the nut is free to rotate, it can move linearly with respect to the screw in the absence of rotation of the screw; or alternatively, if the screw is rotated and the nut is blocked from linear movement, the screw will be free to rotate and the nut will simply rotate with respect to the screw without linear movement.

Referring to FIG. 3, the head end of the screw (right end as viewed in FIG. 3) is mounted in a bracket 45 by means of a bearing 46. Bracket 45 is mounted on frame 12. A coupling 47 connects the screw to a motor 48 (FIG. 2).

At the foot end or left end of the screw, the screw is mounted in a bracket 50 mounted on the frame 12 and the end of the screw is mounted by a thrust bearing 51 to the bracket 50.

Figure 7:
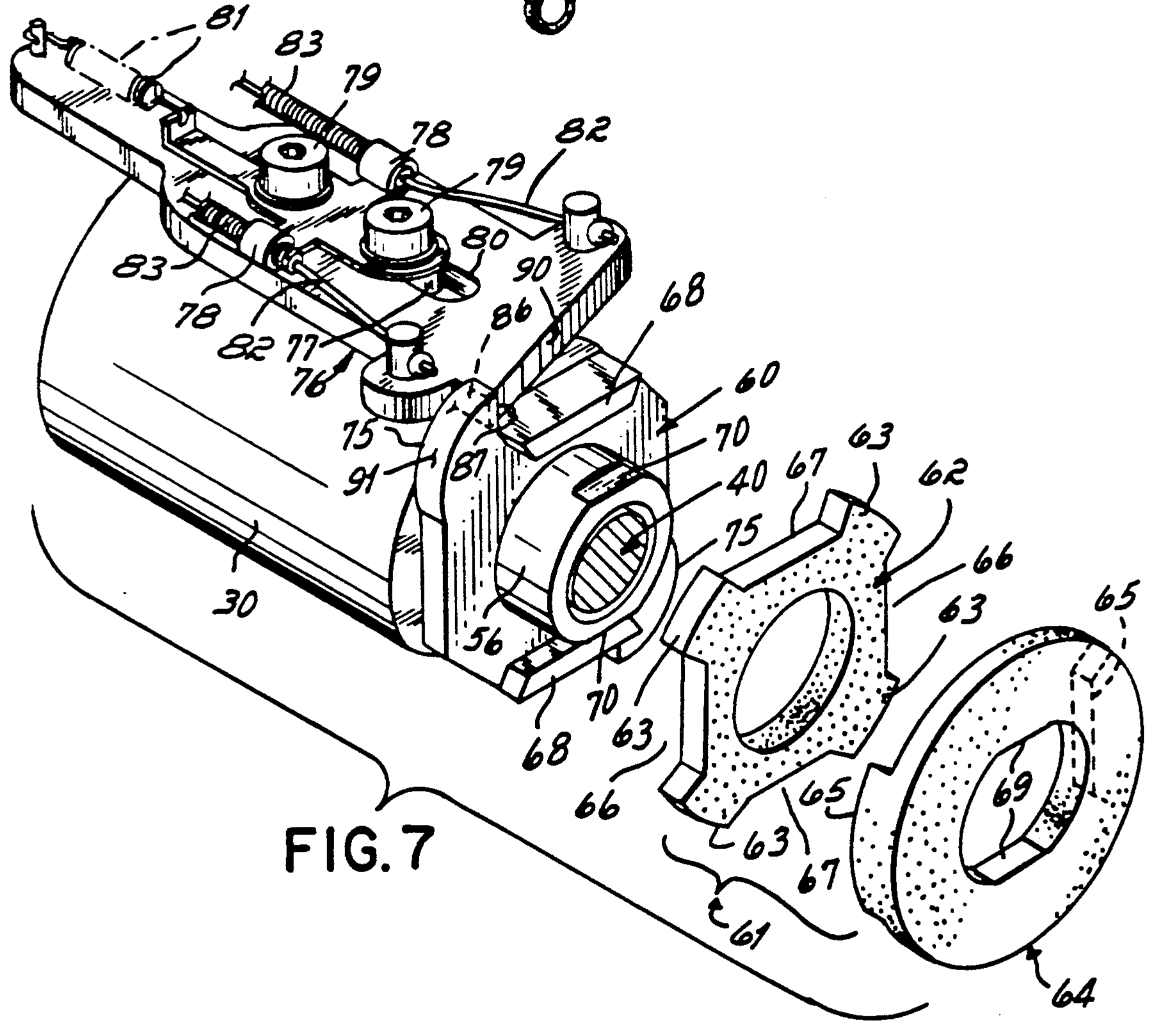
FIG. 7 is a disassembled perspective view of the ball screw.

The nut 35 includes a housing 55 having an end 56 projecting beyond the sleeve 30. A cam collar 60 is fixed to the end 56 of the housing 55 by means of a shock-absorbing coupling 61. As best shown in FIGS. 4 and 7, the shock-absorbing coupling includes a shock pad 62 having four ears 63. The shock pad is a thermoplastic polyurethane ester of a 93±5 durometer. A hub 64 has two flanges 65 that sit in respective recesses 66 formed between adjacent ears 63 on the shock pad. The shock pad has two additional recesses 67 which receive lugs 68 on the cam collar 60 and thus form a cushioned drive connection between the hub and cam collar. The hub is keyed by flats 69 to flats 70 on extending end 56 of nut housing 55, thus forming a rotatable part of the nut 35.

The cam collar has two projecting cam latches 75. The latches cooperate with a cam bolt 76 that is slidably mounted on the sleeve 30. A spacer block 77 (FIG. 4) and a cable bracket 78 are secured by bolts 79 to the sleeve 30. The cam bolt 76 has a longitudinal slot 80 that receives the spacer 77 and permits the cam bolt 76 to reciprocate with respect to the sleeve 30. A tension spring 81 is connected between the cam bolt 76 and the cable bracket 78. The tension spring urges the cam bolt 76 into engagement with the cam collar 60.

The cam bolt is connected to a pair of cables 82 forming part of a Bowden wire having sheaths 83 securely clamped in the cable bracket 78. The other ends of the wires 82 are attached to levers 85, one on each side of the bed (FIGS. 1 and 2). A nurse standing at either side of the bed can pull the cam bolt away from the cam collar, thus permitting the nut 35 to rotate with respect to the sleeve 30. The cam bolt has a latching surface 86 that cooperates with a latching surface 87 on the cam latches 75 of the cam collar. The cam bolt has a cam surface 90 that cooperates with cam surfaces 91 on the cam latches. It can best be seen by reference to FIG. 7 that the cam bolt, when urged by the spring 81, is in the path of the cam collar 60. The engagement of the surfaces 86, 87 on the bolt and cam latches, respectively, blocks rotation of the cam collar in a clockwise direction as viewed in FIG. 7. More particularly, the engagement of the surfaces 86 and 87 blocks the rotation of the nut with respect to the sleeve when the screw 40 is turning in a direction to drive the head panel toward its raised position.

If the screw is rotated in the opposite direction to lower the head panel, the weight of the head panel on the sleeve holds the surfaces 86, 87 in engagement. If the head panel encounters an obstruction, continued rotation of the screw will cause the nut to rotate with respect to the sleeve, that rotation being permitted by the cam surfaces 91 wiping against the cam surface 90 of the bolt causing the bolt to reciprocate back and forth as the cam latches pass the bolt.

Alternatively, when the head panel is manually raised, with the motor being deenergized, the sleeve will exert a linear force against the nut. Since the screw is fixed, the nut will rotate around the screw and within the sleeve, the rotation being permitted by the wiping of the surface 91 of the cam latches against the cam surface 90 of the cam bolt.

Referring to FIG. 2, a dashpot 95 has a rod 96 pivotally connected to the lever 25 that is attached to the head panel 17. The dashpot includes a cylinder 97 fixed to the frame. When the head panel is in the raised position and the cam bolt is released by the nurse pulling on one of the levers 85, the dashpot provides assurance that the head panel will not slam down onto the bed frame.

In the operation of the invention, when the head panel is to be raised or lowered in a conventional manner, the motor 48 is energized to rotate the screw 40. As the screw rotates, the ball nut and sleeve, connected together by the cam collar and cam bolt, move linearly to act upon the lever 25, thereby raising or lowering the head panel 17. If, on a motor driven lowering, the head panel encounters an obstruction, the cam collar and cam bolt will ratchet with respect to each other, thereby permitting the screw to rotate harmlessly within the nut 35. The motor will continue to drive the screw, but the nut will stand still so that the head panel will not apply undue pressure on the obstacle.

If the nurse desires to raise the head panel manually, that can be done simply by swinging the head panel upwardly. This movement is permitted by the ratcheting of the cam collar against the cam bolt so that the ball nut 35 slides with respect to the screw 40.

If the head panel is in a raised position and the cam bolt is pulled away from the cam collar, the dashpot provides assurance that the head panel will not slam down onto the frame.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A hospital bed comprising:
- a base,
- a patient support mounted on said base including a head panel pivoted to a seat panel,
- a motor mounted on said base,
- a screw and ball nut connecting said motor to said head panel to raise and lower said head panel,
- and ratchet means on said ball nut to permit said head panel to be raised independently of said motor, and to permit said head panel to release from said motor when said motor is lowering said head panel.

2. A hospital bed as in claim 1 further comprising:
- means for releasing the connection between said motor and said head panel,
- and a dashpot between said head panel and said base to prevent said head panel from crashing down on said base.

3. A hospital bed comprising:
- a base,
- a patient support mounted on said base including a head panel pivoted to a seal panel,
- a motor mounted on said base,
- means connecting said motor to said head panel to raise and lower said head panel,
- said connecting means comprising:
- and ratchet means in said connecting means to permit said head panel to be raised independently of said motor, and to permit said head panel to release from said motor when said motor is lowering said head panel,
- an elongated screw connected to said motor to be rotated by said motor,
- a ball nut mounted on said screw, a sleeve rotatably mounted on said nut and connected to said head panel to pivot said head panel as said sleeve moves longitudinally with respect to said screw, a collar fixed to said nut and having a peripheral cam surface and a peripheral latch surface, a cam bolt slidably mounted on said sleeve and having a latch surface normally engageable with said lock collar, a spring connected to said cam bolt and normally urging said latch surface into engagement with said cam collar latch surface, said cam bolt latch surface in engagement with said cam collar latch surface holds said nut from rotating with respect to said sleeve and hence blocks said head panel from pivoting downwardly, said cam surface permitting said head panel to be freely pivoted upwardly.

4. A hospital bed as in claim 3 further comprising:

said ball nut having a cylindrical extension projecting beyond said sleeve, a hub fixed to said extension, and an elastomeric shock absorber forming a driving connection between said hub and said cam collar to minimize the ratcheting noise of said cam collar against said cam bolt.

* * * * *

UNITED STATES PATENT AND TRADEMARK OFFICE
CERTIFICATE OF CORRECTION

PATENT NO. : 5,129,116

DATED : July 14, 1992

INVENTOR(S) : Richard L. Borders et al

It is certified that error appears in the above-identified patent and that said Letters Patent is hereby corrected as shown below:

Column 4, line 56, change "seal" to -- seat --.

Signed and Sealed this

First Day of March, 1994

*Attest:*

BRUCE LEHMAN

*Attesting Officer*

*Commissioner of Patents and Trademarks*